Figure 3A:
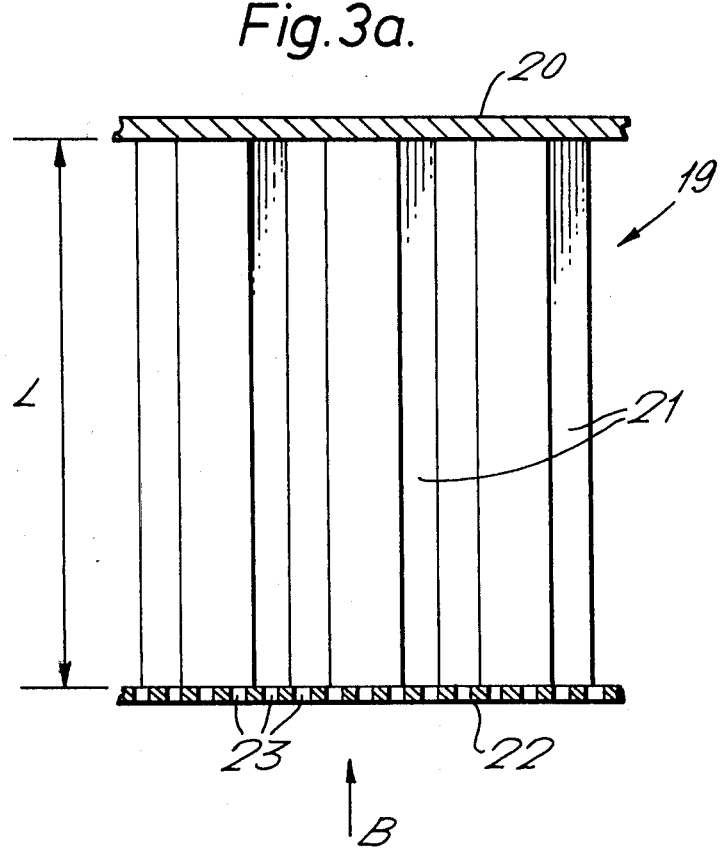

United States Patent [19]

Lowrie

[11] 4,122,672

[45] Oct. 31, 1978

[54] DUCT LININGS

[75] Inventor: Brian W. Lowrie, Allestree, England

[73] Assignee: Rolls-Royce Limited, London, England

[21] Appl. No.: 784,637

[22] Filed: Apr. 4, 1977

[30] Foreign Application Priority Data

Apr. 5, 1976 [GB] United Kingdom ............... 3739/76

[51] Int. Cl.² ........................... F02K 3/06; F02K 1/26
[52] U.S. Cl. .................................... 60/226 R; 181/222
[58] Field of Search ............. 60/226 R, 226 A, 226 B, 60/262, 269; 181/214, 222, 286; 415/119; 137/15.1, 15.2

[56] References Cited

U.S. PATENT DOCUMENTS

| | | | |
|---|---|---|---|
| 3,439,774 | 4/1969 | Callaway et al. | 181/222 |
| 3,508,838 | 4/1970 | Martenson | 181/222 |
| 3,542,152 | 11/1970 | Adamson et al. | 181/222 |
| 3,821,999 | 7/1974 | Guess et al. | 415/119 |
| 3,948,346 | 4/1976 | Schindler | 181/286 |

OTHER PUBLICATIONS

Benzakein et al., "Multiple Pure Tone Noise. .", AIAA Aero-Acoustics Conf., Oct., 1973.

*Primary Examiner*—Robert E. Garrett
*Attorney, Agent, or Firm*—Cushman, Darby & Cushman

[57] ABSTRACT

When fan-blade tips in a turbofan aero engine reach a velocity of greater than about mach 1.1, the regular shock-wave pattern near the blade tips degenerates into an irregular pattern as it moves upstream, thus causing "buzz-saw" noise. An anit-buzz acoustic liner of the spaced-cell type forms part of the fan duct wall near the blade tips and combats the degeneration by reinforcing the regular shock-wave pattern at the expense of the irregular one. This is achieved by making the depth of the cells equal to half the wavelength of the blade passing frequency at the supersonic condition of interest.

8 Claims, 4 Drawing Figures

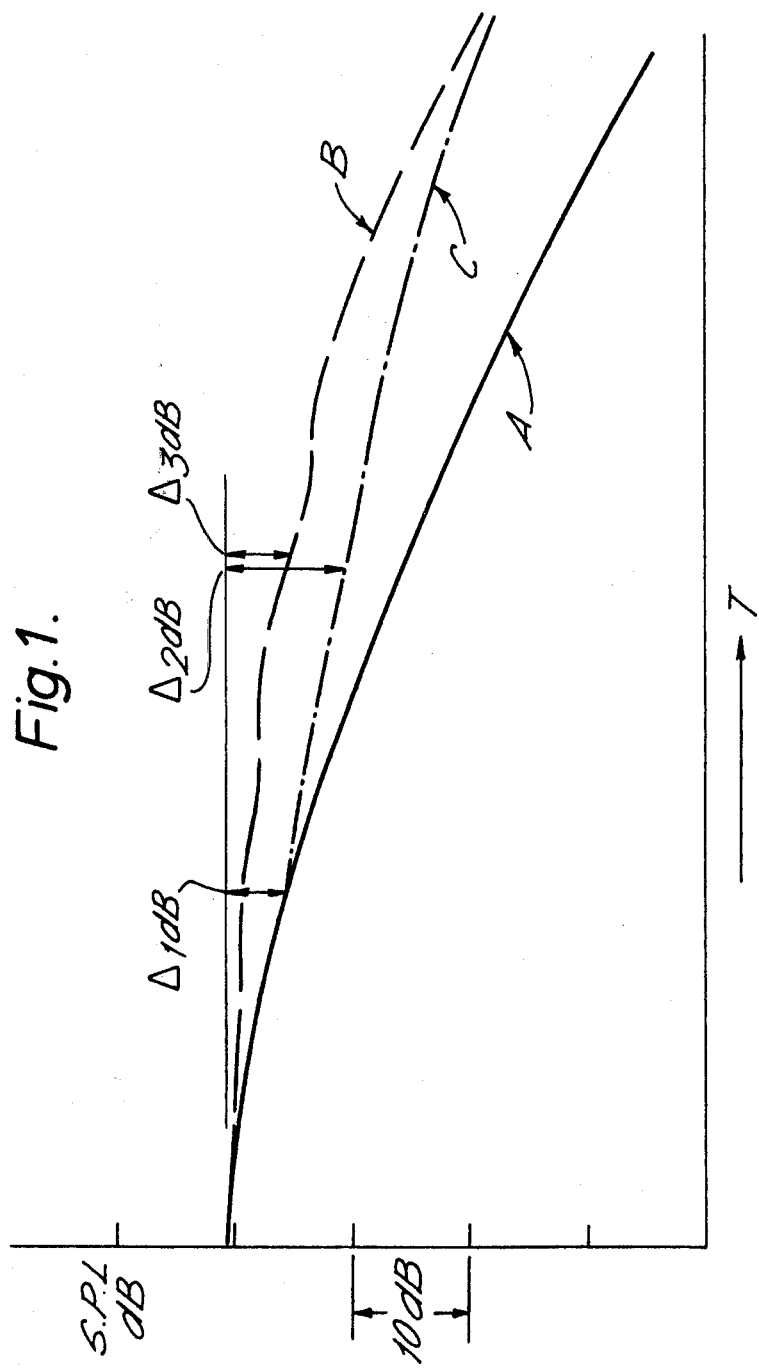

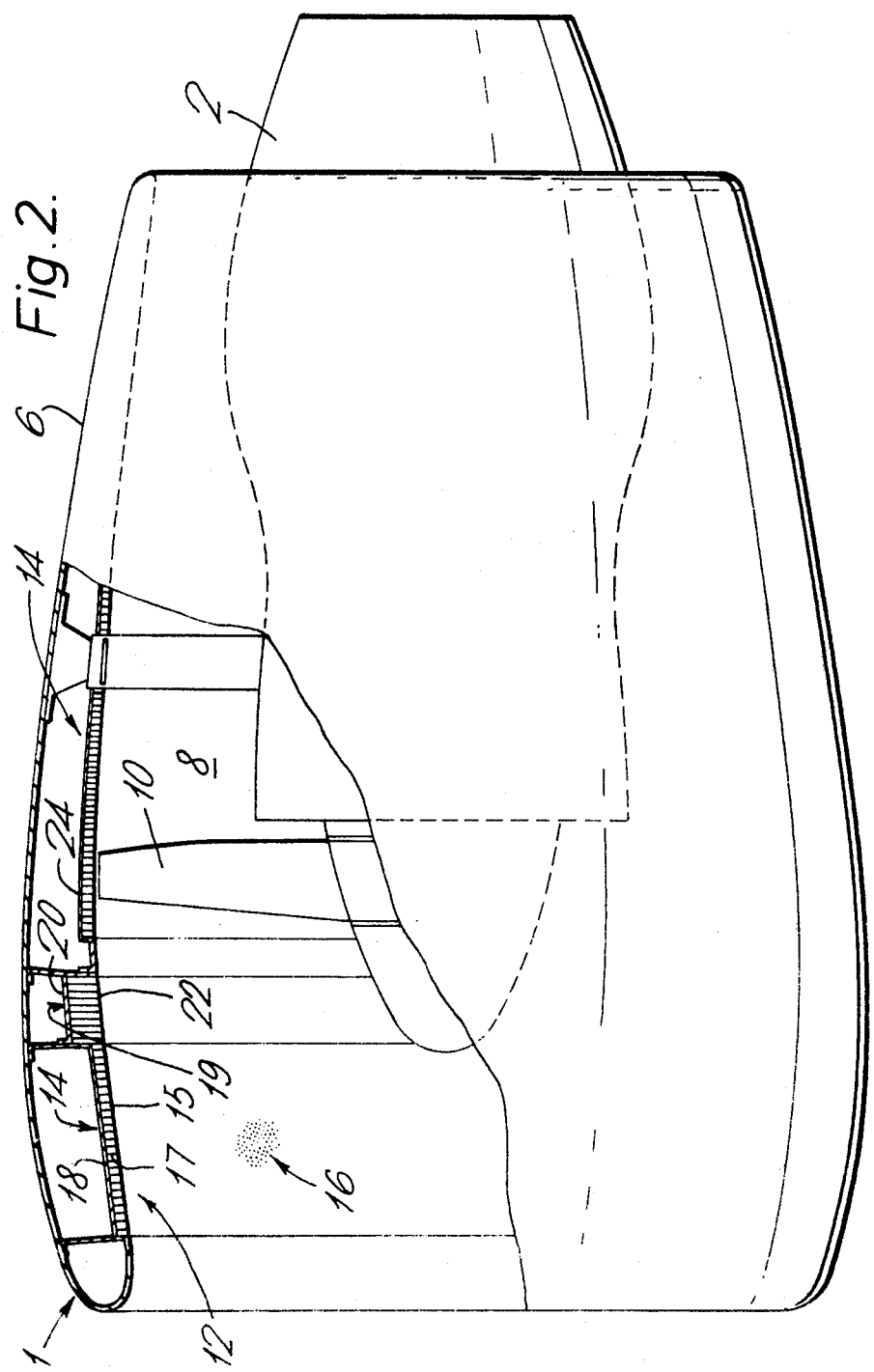

DUCT LININGS

The present invention relates to acoustic linings for ducts containing axial fluid-flow bladed rotors. The linings are of the "honeycomb sandwich" type of construction and the ducts and rotors referred to could comprise, for example, the ducted fan propulsor stages of high by-pass ratio gas turbine aero-engines.

Conventional sound attentuating duct linings for aero engine ducted fans are designed with cells of such a depth that they give maximum attenuation of (i.e., are easily excited into resonance by) the blade passing frequency at a certain predetermined fan speed. This speed is usually the fan speed at take-off in the case of an aero engine, since noise at take-off is the most troublesome, but the fan speed at any other noise sensitive condition could be chosen if necessary.

However, when the fan blade tip velocity exceeds about mach 1.1 relative to the air through which the blades pass, it is found that an irregular shock-wave pattern is produced in the duct and this gives rise to "buzz-saw" noise, otherwise known as "multiple pure tone" noise, which characterises and dominates the noise as perceived in the far field.

In such conditions, conventional duct linings are only of maximum effectiveness at positions close to the fan, because whilst the shock waves are in fact largely at blade passing frequency at positions close to the fan, they degenerate very quickly into a wide range of lower orders of fan rotational frequency (the "buzz-saw" noise) as they spiral away from the fan. These degenerate frequencies do not adequately excite the cells of the lining into resonance and since it is not practical to provide linings which can resonate to all the wide range of degenerate frequencies present in the fan duct, "buzz-saw" noise has hitherto remained a problem to the designer concerned with noise abatement.

An allied problem concerns the fact that the natural decay rate of an irregular shock-wave pattern is less than the decay rate of a regular shockwave pattern. Thus, if an irregular shockwave pattern is present in the fan duct, the noise level in the far field is greater than it would be if a regular shock-wave pattern were present.

The present invention alleviates the above problems by providing a way of producing a more regular shock-wave pattern in the fan duct.

According to the present invention, an acoustic lining, suitable for a duct containing an axial fluid-flow bladed rotor whose rotor blade tips attain a velocity of at least mach 1.1 relative to the fluid at a predetermined rotational speed, forms at least part of the duct wall near to the plane of rotation of said blades and comprises a pervious facing skin, an impervious backing layer and a spaced cell honeycomb layer sandwiched between the facing skin and the backing layer, the cells being of a depth substantially equal to half the wavelength of the blade passing frequency at the predetermined rotational speed, whereby shock-wave energy which enters the acoustic liner is fed back into the duct to tend to maintain regular spacing and uniform amplitude of the shock-wave pattern in the duct.

It is preferred that the pervious facing skin of the above acoustic lining comprises a perforated metal sheet, the perforations comprising at least 50% of the surface area of the sheet.

The invention also embraces an axial fluid-flow machine having a duct provided with the above mentioned lining. In order to obtain better noise attenuation, the duct is preferably provided with a further acoustic lining which forms at least part of the duct wall upstream of the first acoustic liner and which is constructed to resound to the blade passing frequency, or harmonics thereof, whereby the further acoustic lining attenuates the shock-wave pattern in the duct by resonance effects.

The axial fluid-flow machine may be a by-pass gas turbine aero engine, the duct and the bladed rotor comprising a ducted fan propulsor stage of the engine.

The predetermined rotational speed may be the maximum regularly attained during normal operation of the engine.

Figure 3B:
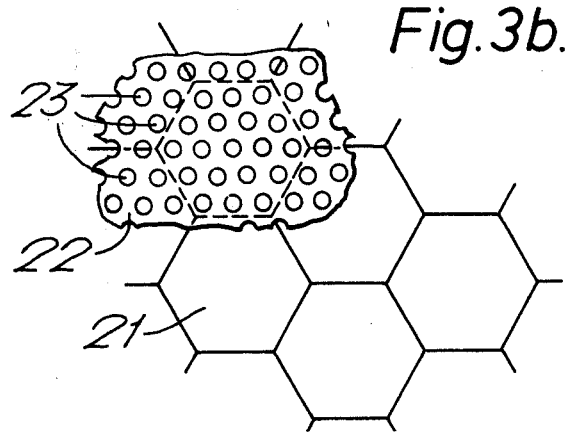

An embodiment of the invention will now be described by way of example only and with reference to the accompanying drawings in which:

FIG. 1 is a graph showing the theoretical attenuation of both regular and irregular (non-uniform) shock-wave systems within a duct, FIG. 2 diagrammatically shows a duct acoustic lining in accordance with the invention in position in the fan duct of a front fan high by-pass ratio gas turbine aero engine, and FIGS. 3a and 3b show scrap views of the structure of the duct lining. FIG. 3a is a sectional side elevation of the lining and FIG. 3b is a view on arrow B in FIG. 3a.

A theoretical advantage in maintaining a regular shock-wave pattern upstream of the fan blades is shown in FIG. 1 in which shock-wave amplitude in sound pressure level decibels (SPLdB) is plotted against the non-dimensional time T taken for a shock-wave in the pattern to propagate upstream of the blades in a duct. The full line A defines the maximum decay rate for a regular shock-wave pattern and the dashed line B shows that the decay rate for an irregular shock-wave pattern is much less.

If an acoustic lining according to the invention is used, a substantially regular shock-wave pattern is maintained over the breadth of the lining, and as shown on the graph, natural attenuation would reduce the shock strength by say, $A_1$ dB at the upstream end of the lining. Upstream of the lining the uniform shock-wave pattern breaks down in the duct and the rate of natural attenuation is reduced as shown by the chain-dotted line C. However, with a lining according to the invention in position (instead of a plain duct wall) the shock-wave strength is reduced by say $A_2$ dB at the inlet to the duct compared with $A_3$ dB had the liner not been in position.

Referring now to FIG. 2, a high by-pass ratio gas turbine engine 1 has a core engine 2 and a fan casing 6 defining fan duct 8. Fan casing 6 is shown partially "broken away" to reveal front fan 10. The fan duct inner wall 12, which is part of the structure of fan casing 6, is formed from several annuli 18, 20, 24 and others not referenced, which are welded or bolted to each other in axial succession. Most of them are faced with acoustic honeycomb structure. The construction is such that the fan duct 8 is provided with acoustic linings on its outer wall 12 over a substantial proportion of its axial and circumferential extent.

As shown in FIG. 2, the acoustic linings provided in this embodiment are of two types. Reference number 14 indicates the conventional sound attenuating type having a facing sheet 15 with a large number of regularly arranged small holes 16 therethrough which allow pressure variations in the fan duct 8 to be communicated to the honeycomb core cells 17. The structural annuli 18, 24 form rigid impervious backing sheets for the honeycomb. The walls of honeycomb cells 17 extend between and are bonded to the sheets 15 and 18 and the depth of the cells is such that the columns of air contained in them resonate when excited by frequencies present in the fan duct 8, thus dissipating energy. Thus to attenuate noise of wavelengths at or near λ the depth of cell could be, for example, (λ/8). Such linings act most effectively on frequencies at or near the frequency for which they are designed, or simple harmonics of them, and are not very effective in attenuating the "buzz-saw" noise referred to hereinbefore.

Reference number 19 indicates an acoustic lining according to the present invention. The mode of construction as shown more clearly in FIGS. 3a and 3b is conventional, in that structural annulus 20 again forms a rigid impervious backing sheet to honeycomb core cells 21, the facing sheet 22 having holes 23 therein. However, the depth L of each of the cells 21 is such as to be approximately equal to half the wavelength of the fan blade passing frequency at a predetermined fan rotational speed for which the fan blade tip velocity relative to the air through which it passes is greater than about mach 1.1. The predetermined fan speed could be, for example, that at take-off, but another condition at which "buzz-saw" noise is a problem could be chosen.

In operation at the predetermined fan rotational speed, shock-waves of unequal spacing and amplitude propagate upstream from the fan 10 and pass over lining 19. Considering the situation with respect to one honeycomb cell 21, some of the energy of a shock-wave passes through the high porosity facing sheet 22, propagates down honeycomb cell 21, is reflected from impervious backing sheet 20 and arrives back at the facing sheet 22 (that is, the surface 12 of the duct 8) displaced in time and position with respect to its parent shock-wave by an amount corresponding to one wavelength of the fan blade passing frequency. This position coincides with what would be the position of the next shock-wave in a regular shock-wave pattern; the lining 19 thus tends to "feed-back" energy into the shock-wave pattern either before or after the next succeeding shock-wave arrives in position over the cell. The irregular shock-wave pattern is thus modified at that point and multiple repetition of the process for each cell 21 over the width and circumferential extent of the lining 19 tends to produce the more regular shock-wave pattern required at the expense of the irregular pattern. The regular shock-wave pattern decays more rapidly than would the irregular pattern, and because it consists predominantly of one frequency it is amenable to further attenuation by a resonant lining.

Thus, having produced a shock-wave system in which most of the shock-waves in the duct upstream of the lining 19 are at or near to fan blade passing frequency, the conventional duct lining 14 is employed upstream of lining 19 to attenuate the shock-waves at or near to blade passing frequency by means of resonance effects as known in the prior art.

It should be noted regarding the construction of the lining 19 that the holes 23 in facing sheet 22 should preferably comprise at least 50% of its surface area in order to ensure adequate transference of energy from the shock-wave into the cell 21 and out again. Further, if facing sheet 22 is omitted from the construction, the open honeycomb is of even greater effectiveness in producing a regular shock-wave pattern in the duct, but this construction is not used in practice because in use such open cells tend to be excited into unwanted resonances by edge effects similar to those occurring in organ pipes. A facing sheet such as 22 damps these resonances and has the added advantage of stabilising the air flow over the lining 19.

I claim:

1. In a duct containing an axial fluid-flow bladed rotor whose rotor blade tips attain a velocity of at least mach 1.1 relative to the fluid at a predetermined rotational speed, a non-sound absorbing by resonance acoustic lining which at said predetermined speed acts to combat the degeneration of shock-waves at blade passing frequency into multiple pure tone noise and which forms at least part of the duct wall near to the plane of rotation of said blades, said non-sound absorbing by resonance liner comprising a pervious facing skin, an impervious backing layer, and a spaced cell honeycomb layer sandwiched between said facing skin and said backing layer, said cells being of a depth substantially equal to half the wavelength of said blade passing frequency, whereby shock-wave energy which enters said non-sound absorbing by resonance liner is fed back into the duct to tend to maintain regular spacing and uniform amplitude of the shockwave pattern in said duct.

2. A non-sound absorbing by resonance acoustic lining as claimed in claim 1 in which the previous facing skin comprises a perforated metal sheet, the perforations comprising at least 50% of the surface area of the sheet.

3. The combination of claim 1 in which the bladed rotor comprises a fan rotor in a turbofan aero engine.

4. In a duct containing an axial fluid-flow bladed rotor whose rotor blade tips attain a velocity of at least mach 1.1 relative to the fluid at a predetermined rotational speed, the combination of a non-sound absorbing by resonance acoustic liner which forms at least part of the duct wall near to the plane of rotation of said blades, and a sound-absorbing by resonance acoustic liner which forms at least part of the duct wall upstream of said non-sound absorbing by resonance acoustic liner and which is constructed to resound to that blade passing frequency, or harmonics thereof, which corresponds to said predetermined rotational speed, said non-sound absorbing by resonance acoustic liner comprising a pervious facing skin, an impervious backing layer, and a spaced cell honeycomb layer sandwiched between said facing sking and said backing layer, said cells being of a depth substantially equal to half the wavelength of said fan blade passing frequency, whereby said non-sound absorbing by resonance acoustic liner tends to maintain a substantially regular shock-wave pattern of frequency equal to or harmonically related to said fan blade passing frequency over its circumferential and axial extent, and said sound-absorbing by resonance acoustic liner attenuates said substantially regular shock-wave pattern by resonance effects.

5. The combination of claim 4 in which the pervious facing skin of said non-sound absorbing by resonance lining comprises a perforated metal sheet, the perforations comprising at least 50% of the surface area of the sheet.

6. The combination of claim 4 in which the bladed rotor comprises a fan rotor in a turbofan aero engine.

7. In a duct containing an axial fluid-flow bladed rotor whose rotor blade tips attain a velocity of at least mach 1.1 relative to the fluid at a predetermined rotational speed, a non-sound absorbing by resonance acoustic liner which at said predetermined speed acts to combat the degeneration of shock-waves at blade passing frequency into multiple pure tone noise and which forms at least part of the duct wall upstream of the plane of rotation of said blades, said non-sound absorbing by resonance liner comprising a pervious facing skin, an impervious backing layer, and a spaced cell honeycomb layer sandwiched between said facing skin and said backing layer, said cells being of a depth substantially equal to half the wavelength of said blade passing frequency, whereby shock-wave energy which enters said non-sound absorbing by resonsance liner is fed back into the duct to tend to maintain or restore to regular spacing and uniform amplitude of the shock-wave pattern in said duct.

8. The combination of claim 7 including a sound absorbing by resonance acoustic liner also forming at least a part of the duct wall, said sound absorbing by resonance acoustic liner being positioned upstream of said non-sound absorbing by resonance acoustic liner.

UNITED STATES PATENT OFFICE
CERTIFICATE OF CORRECTION

Patent No. 4,122,672　　　　　　　　　　Dated October 31, 1978

Inventor(s) Brian W. Lowrie

It is certified that error appears in the above-identified patent and that said Letters Patent are hereby corrected as shown below:

In the above-identified patent, please change
"[30] Foreign Application Priority Data　Apr. 5, 1976 [GB]
United Kingdom........3739/76" to --[30] Foreign Application Priority Data　Apr. 5, 1976 [GB]
United Kingdom........13739/76 --

Signed and Sealed this

Ninth Day of January 1979

[SEAL]

Attest:

RUTH C. MASON
Attesting Officer

DONALD W. BANNER
Commissioner of Patents and Trademarks